(No Model.)
H. E. CROME.
VEHICLE WHEEL.
No. 397,897. Patented Feb. 19, 1889.
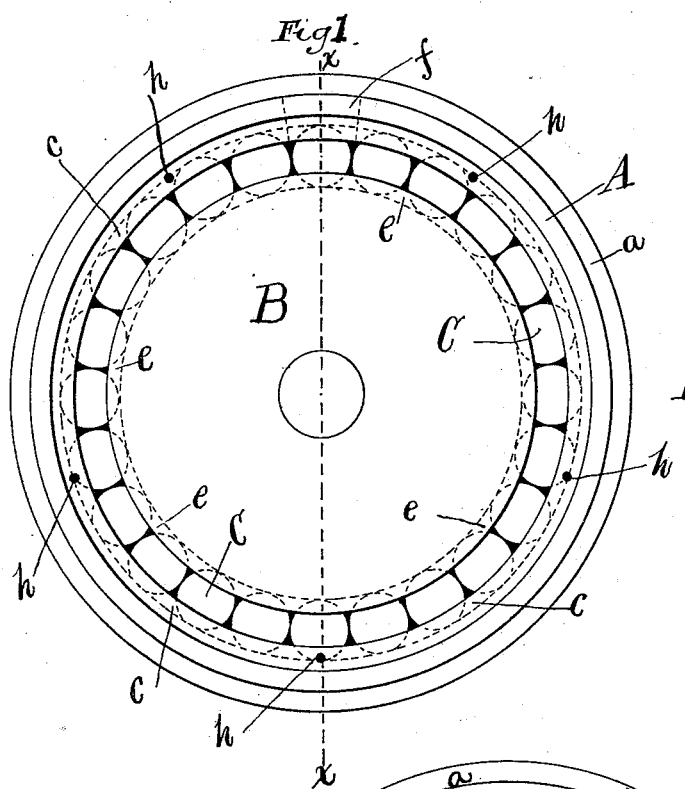
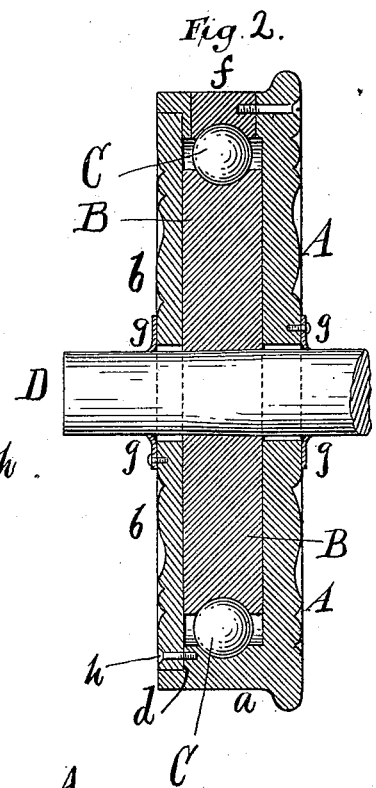
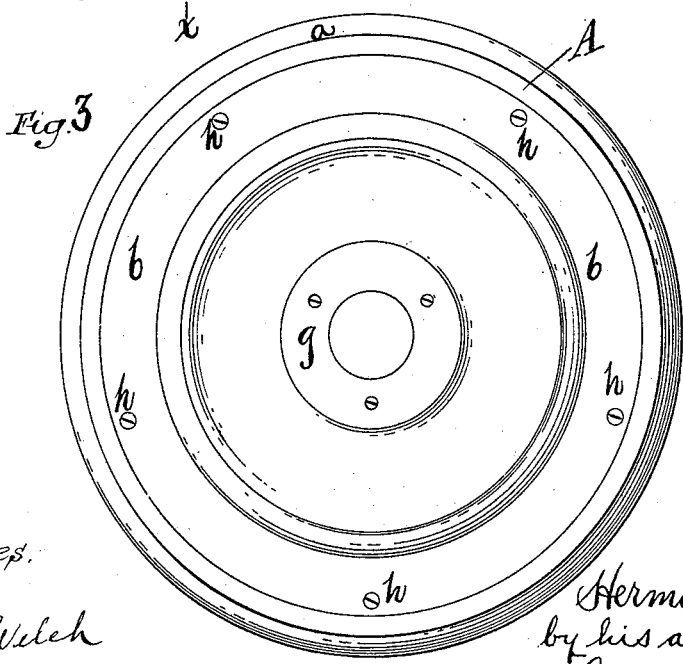
Witnesses.
Edgar Welch
Samuel Block.
Inventor
Herman E. Crome
by his attorneys
Bowen & Dennis

UNITED STATES PATENT OFFICE.

HERMAN E. CROME, OF JERSEY CITY, NEW JERSEY.

VEHICLE-WHEEL.

SPECIFICATION forming part of Letters Patent No. 397,897, dated February 19, 1889.

Application filed March 23, 1888. Serial No. 268,201. (No model.)

*To all whom it may concern:*

Be it known that I, HERMAN E. CROME, of Jersey City, in the county of Hudson and State of New Jersey, have invented a certain new and useful Improvement in Vehicle-Wheels, of which the following is a specification.

I will describe the improvement in detail and then point out the novel features in claim.

In the accompanying drawings I have shown my improvement as applied to a railroad-car wheel, Figure 1 being a perspective view of a railroad-car wheel embodying my improvement, a portion of the outer shell being removed to afford a view of the interior. Fig. 2 is a section taken through the dotted line $x$ $x$, Fig. 1, and Fig. 3 is a face view of the completed wheel.

Similar letters of reference designate corresponding parts in all the figures.

A designates the outer portion of a railroad-car wheel embodying my improvement. This outer portion is made hollow or shell like, and its outer periphery or circumference, $a$, is similar in shape to the outer periphery or circumference of railroad-car wheels as ordinarily made. This shell-like outer portion is made in two parts, one part, as $b$, being intended to fit as a cover on the other part. The circular portion or circumference of the outer shell, A, is preferably made thicker at one portion than at another, and the portion of greater thickness will have a groove, $c$. Where the portions of greater and less thickness meet a shoulder, $d$, will be formed. The part of less thickness will be of a depth corresponding to the thickness of the part $b$ of the shell, so that the part $b$ will fit in position. The part $b$ may be fastened in place on the shell A in any desirable manner—as, for instance, by bolts $h$.

Within the shell A is the inner portion, B, of the wheel. This inner portion is shown as made solid, and as having a groove, $e$, formed in its circumference, and it is of smaller diameter than the interior diameter of the outer shell, A. Between the circumference of the inner portion, B, and the inner periphery or circumference of the outer shell, A, balls C are placed. These balls may be made of any suitable material—such, for instance, as steel.

The balls C are shown as working between the grooves $c$ and $e$, and they are made of such size that the periphery of the portion B will be held at an equal distance from the inner periphery or circumference of the shell A at every point. The distance between the opposite points of the circumference of the inner portion, B, and the inner periphery or circumference of the outer portion, A, touched by a ball when in position will preferably be so proportioned as to permit of the use of balls of such diameter that when all the balls are in position they will not only touch the inner periphery of the outer or shell-like portion and the periphery of the inner portion, but will also be so close to each other as to leave no space between any two balls. The diameters of the circles formed at the deepest points of the inner and outer grooves will therefore always be so proportioned as to admit of the use of a number of balls which when in position will touch each other. For instance, suppose I desire to use twenty-four balls, each five inches in diameter. I make a groove in the outer portion or shell the diameter of the circle formed by which at its deepest point will be 40.6971 inches, and the diameter of the circle formed at the deepest point of the groove in the inner portion will be 35.6971 inches.

The balls C are placed in position between the grooves $c$ and $e$ in any desirable manner. I have shown a hole, $f$, tapering inwardly from the outer to the inner surface of the circumference of the shell A, and through this hole the balls may be dropped. Of course the inner portion, B, will be held while the balls are being placed in position, so that the balls may roll around between the grooves $c$ and $e$ until they reach the position they are intended to assume. After all the balls are in position a wedge is inserted in this hole and secured in position by a pin or otherwise. The outer surface of this wedge will of course be of a contour corresponding to the outer circumference of the shell A, while the opposite surface of the wedge will be of a contour corresponding to the inner circumference of the shell A. The balls C may, however, be placed in position between the periphery of the portion B and the inner circumference of the shell A in any other desirable manner, and the grooves c and e might be dispensed with.

It is obvious that when the balls C are all in position between the grooves c and e the outer portion or shell, A, and the inner portion, B, will be held in position so that they cannot be separated without removing the balls. The balls, however, permit of the portions A and B having motion independently of each other.

D is a car-axle. It is attached to the portion B in any suitable manner—as, for instance, by being shrunk thereto by hydraulic pressure.

The axle D will be so attached to the car-truck that it will not revolve. When, therefore, the car is moved, the weight borne by the axle is transferred by the portion B through the balls C to the outer shell, A. The axle D will hold the portion B stationary, and the only parts of the wheel which will have movement are the balls C and outer shell, A.

It will be seen that by my improvement I dispense with journal-bearings and obviate the necessity for the use of oil. Brakes can be more effectively applied on cars having wheels embodying my improvement than on cars having ordinary wheels, and my wheels can be used to greater advantage in turning curves.

I may prevent the entrance of dust, sand, or dirt of any kind into my wheels or around the juncture of the axle and wheel in any suitable manner. In the present case I use washers g of suitable material.

Of course my improvement may be used in wheels other than railroad-car wheels, and therefore I do not limit myself to railroad-car wheels.

What I claim as my invention, and desire to secure by Letters Patent, is—

As a new article of manufacture, a wheel having an outer hollow shell-like portion, as A b, an inner portion, as B, balls or equivalent devices working between a groove on the periphery of the portion B and a groove on the inner periphery or circumference of the shell A, and means whereby said balls may be placed in position, substantially as specified.

HERMAN E. CROME.

Witnesses:
J. R. BOWEN,
JNO. DENNIN.